(12) United States Patent
Richard

(10) Patent No.: US 9,774,842 B2
(45) Date of Patent: Sep. 26, 2017

(54) DEVICE FOR 3D DISPLAY OF PHOTO FINISH IMAGE

(71) Applicant: Swiss Timing Ltd, Corgemont (CH)

(72) Inventor: Pascal Richard, Corgemont (CH)

(73) Assignee: Swiss Timing Ltd, Corgemont (CH)

( * ) Notice: Subject to any disclaimer, the term of this patent is extended or adjusted under 35 U.S.C. 154(b) by 459 days.

(21) Appl. No.: 14/380,208

(22) PCT Filed: Feb. 11, 2013

(86) PCT No.: PCT/EP2013/052698
§ 371 (c)(1),
(2) Date: Aug. 21, 2014

(87) PCT Pub. No.: WO2013/124180
PCT Pub. Date: Aug. 29, 2013

(65) Prior Publication Data
US 2015/0015675 A1 Jan. 15, 2015

(30) Foreign Application Priority Data

Feb. 22, 2012 (EP) .................................... 12156514

(51) Int. Cl.
| H04N 13/02 | (2006.01) |
|---|---|
| G03B 15/00 | (2006.01) |
| G03B 17/24 | (2006.01) |
| G03B 35/08 | (2006.01) |
| G07C 1/24 | (2006.01) |
| G04F 10/00 | (2006.01) |
| G03B 41/00 | (2006.01) |
| H04N 7/08 | (2006.01) |
| H04N 7/18 | (2006.01) |

(52) U.S. Cl.
CPC .......... *H04N 13/0242* (2013.01); *G03B 15/00* (2013.01); *G03B 17/24* (2013.01); *G03B 35/08* (2013.01); *G03B 41/00* (2013.01); *G04F 10/00* (2013.01); *G07C 1/24* (2013.01); *H04N 7/0806* (2013.01); *H04N 7/181* (2013.01)

(58) Field of Classification Search
CPC ........ G03B 15/00; G03B 17/24; G03B 41/00; G03B 35/08; G04F 10/00; G07C 1/24; H04N 13/0242; H04N 7/0806; H04N 7/181
USPC ..................... 348/42–60, 157, 147
See application file for complete search history.

(56) References Cited

U.S. PATENT DOCUMENTS

| 3,502,009 A | 3/1970 | Connors |
|---|---|---|
| 4,488,794 A | 12/1984 | Dolgow et al. |
| 5,671,010 A * | 9/1997 | Shimbo ................... G04F 13/02 348/157 |
| 5,974,272 A | 10/1999 | Kiesow et al. |
| 6,141,036 A | 10/2000 | Katayama et al. |

(Continued)

OTHER PUBLICATIONS

International Search Report issued Aug. 19, 2014, in PCT/EP13/052698 filed Feb. 11, 2013 (with English Translation of Categories of Cited Documents).

*Primary Examiner* — William C Vaughn, Jr.
*Assistant Examiner* — Naod Belai
(74) *Attorney, Agent, or Firm* — Oblon, McClelland, Maier & Neustadt, L.L.P.

(57) ABSTRACT

An imaging device for a photo finish system, including a first camera aligned on a finish line and a mechanism for display of three dimensional stereoscopic images.

8 Claims, 3 Drawing Sheets

(56) References Cited

U.S. PATENT DOCUMENTS

| | | |
|---|---|---|
| 6,433,817 B1 | 8/2002 | Guerra |
| 6,545,705 B1* | 4/2003 | Sigel ................ H04N 7/188 |
| | | 348/157 |
| 9,390,752 B1* | 7/2016 | McNeill ............... G11B 27/031 |
| 2010/0166294 A1* | 7/2010 | Marrion ............... G06K 9/6211 |
| | | 382/154 |
| 2011/0085789 A1 | 4/2011 | Campbell et al. |
| 2013/0222554 A1* | 8/2013 | Hayashi ............... H04N 13/021 |
| | | 348/50 |

* cited by examiner

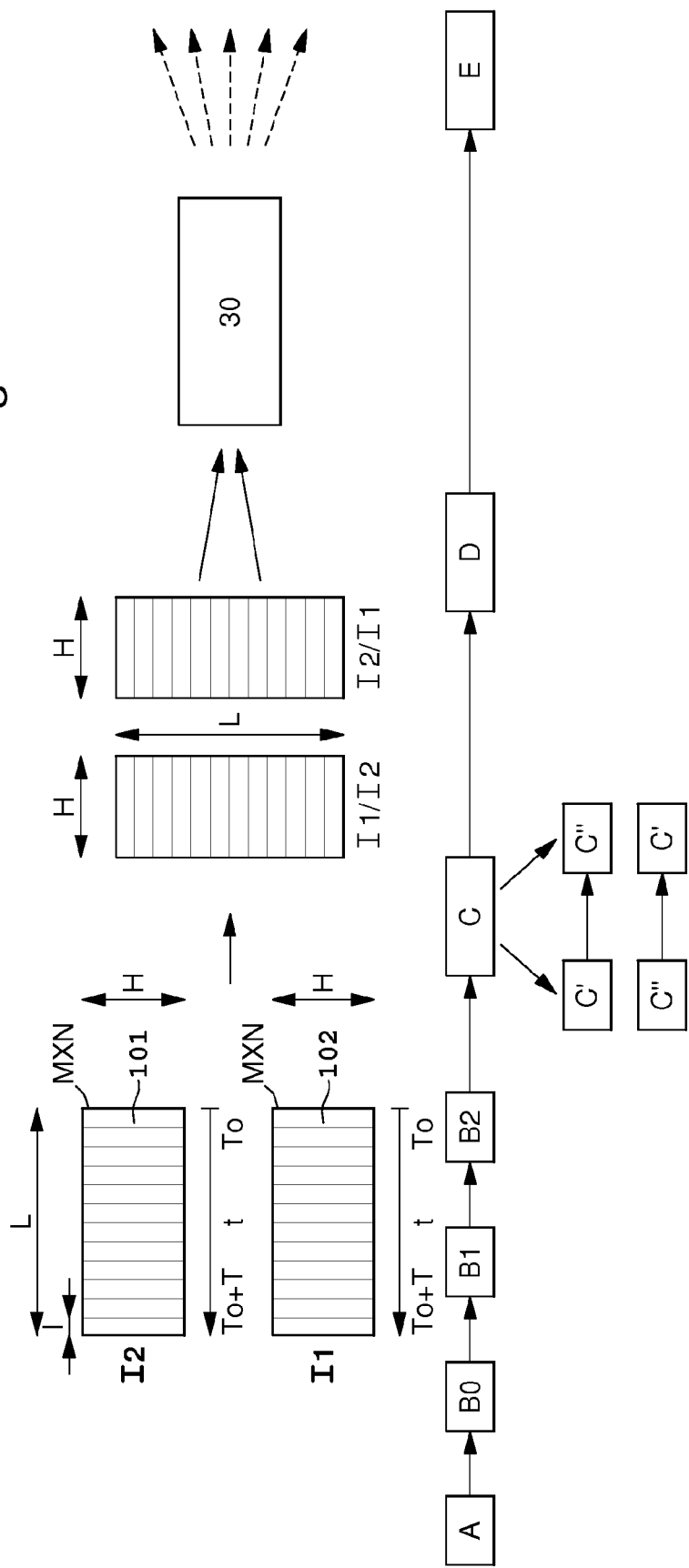

DEVICE FOR 3D DISPLAY OF PHOTO FINISH IMAGE

FIELD OF THE INVENTION

The present invention concerns the display of timed data during a sports competition, and more specifically a photo finish type at a finish line.

BACKGROUND OF THE INVENTION

In timed sports races or competitions, and in particular athletics races, the timing device is generally started in a synchronised manner with the emission of an acoustic signal, and stopped for each competitor when each competitor respectively crosses the finish line. It may happen however that the resolution of the timing system, for example typically a hundredth of a second, is insufficient to distinguish between two competitors whose measured time is identical. To achieve this, auxiliary devices are required to assist timing and there are manually operated systems for this purpose which are based on the visual recognition of images taken in sequence by a high definition camera very precisely centred on the finish line. An operator analyses, in an asynchronous manner after the competitors have finished the race, the sequence of images taken at given times and consequently corresponding to a measured time; this analysis therefore makes it possible to determine a more accurate line crossing time for each competitor, for example to a thousandth of a second, and to rank the competitors in a reliable manner. This type of auxiliary timing display is usually called a "photo finish" device.

This type of auxiliary display system, known for a relatively long time, is disclosed for example in U.S. Pat. No. 3,502,009 relating to a dog race. The photo finish device enables time values, obtained using a first lens centred on a timing device, to be superimposed on images of the competitors using a second lens centred on the finish line. The developed film thus makes it possible to determine the first dog to cross the line and its lap or finish time.

To overcome the problem of competitors masking each other, which may prevent the operator performing a pertinent analysis of the sequence of images around the disputed measured time, photo finish systems very often use several cameras. However, because of the precise alignment required on the finish line, none of the cameras used can be shifted laterally to resolve this masking problem; this is why the two cameras employed are respectively located on either side of the finish line.

There are also known stereoscopic optical systems for the display of three dimensional images, which provide a more user-friendly and intuitive rendering for the person viewing the images. These stereoscopic systems are based on the construction of an image in relief in the same manner as the brain, i.e. from the analysis of two plane images taken along distinct axes of view. These stereoscopic systems thus typically use dual lens cameras, the space between the lenses corresponding, for example, to the mean interocular space, namely around 75 to 80 millimeters. However, these optical systems are unfortunately unsuitable for a photo finish system because of the lateral offset that is required between the photograph shooting axes, which cannot be simultaneously aligned on the finish line and therefore there is no possibility of these systems overcoming the shortcomings of the timing system in a reliable and accurate manner.

There is consequently a need for auxiliary timing systems which are free of these known limitations.

BRIEF SUMMARY OF THE INVENTION

It is an object of the present invention to provide a device and a method for the display of three dimensional photo finish images.

It is another object of the present invention to provide a device and a method of this type which are simple to implement and inexpensive.

These objects are achieved, in particular, as a result of an imaging device for a photo finish system, including a first camera aligned on a finish line, and characterized in that the device includes a second camera also aligned on the finish line and offset by a first height in relation to the first camera for the display of three dimensional stereoscopic images.

These objects are also achieved as a result of a method for forming a three dimensional photo finish image, characterized in that it contains the steps of defining a shot duration T, of time synchronising a first and a second camera aligned on the finish line and offset by a height h, on a reference time To, of forming a first image by the first camera for reference time To and of forming a second image by the second camera for the same reference time To, and then aggregating these two images to form a stereoscopic image.

Specific embodiments of the invention are defined in the dependent claims.

One advantage of the present invention is in producing a photo finish image in relief in a simple manner, without requiring complex image processing tools, and which can easily be displayed to spectators present in a sports arena or in front of their TV screen.

Another advantage of the solution is to provide a modular architecture for the implementation of a stereoscopic display system and method, which requires few modifications to ordinary existing infrastructures for photo finish systems.

BRIEF DESCRIPTION OF THE DRAWINGS

Advantageous example implementations of the invention are given in the description and illustrated in the annexed Figures, in which:

FIG. 3 shows a diagram of the various processing steps for forming and displaying images according to a preferred embodiment of the invention.

EXAMPLE EMBODIMENT(S) OF THE INVENTION

Figure 1A:
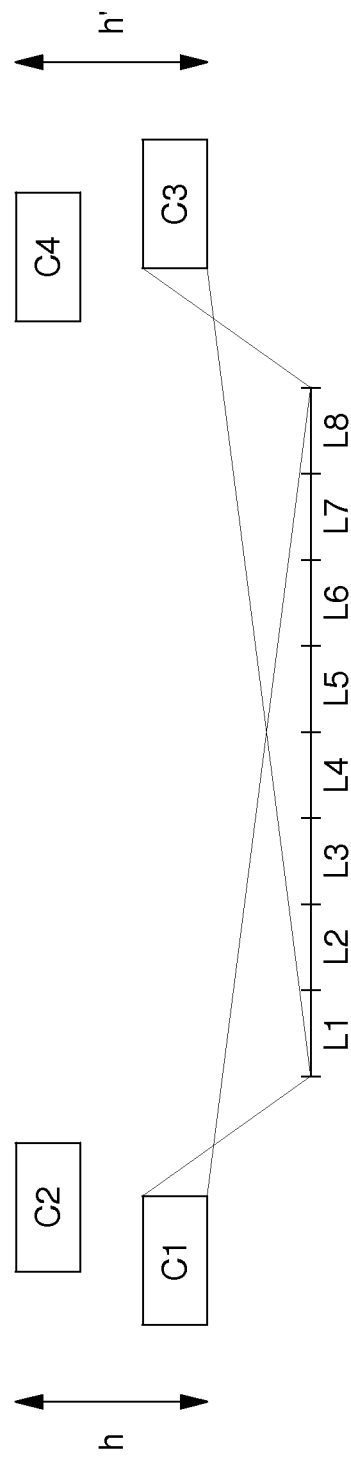
FIGS. 1A and B respectively show a front view, in the axis of a finish line, and a top view of a plurality of cameras used in a preferred embodiment of the invention.
Figure 1B:
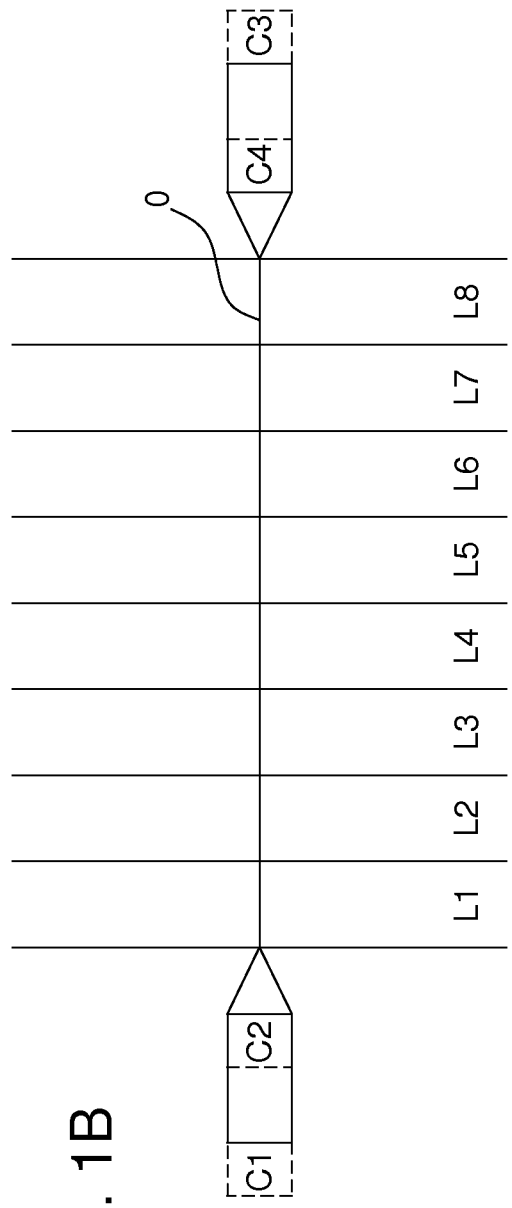

FIG. 1A shows a front view, in the axis of a finish line, of a plurality of cameras used in a preferred embodiment of the present invention. This Figure shows the various lanes L1, L2, L3, L4, L5, L6, L7, L8, which are the normal lanes of an athletics track, and four cameras C1, C2, C3, C4 arranged at a height on each side of the athletics track. According to this preferred embodiment, the stereoscopic images are formed from two images taken at the same reference moment by both cameras which are offset vertically from each other. Thus a first camera C1 and a second camera C2, both aligned on the finish line, are offset from each other by a first height h and similarly a third camera C3 and a fourth camera C4, both aligned on the finish line, are offset from each other by a second height h'. The advantage of arranging two pairs of cameras located on either side of the finish line, i.e. in forming pairs C1-C2 and C3-C4, consists in the ability to choose the most advantageous camera pair according to the position of the various competitors on the finish line, to avoid any masking. A first pair of cameras, for example the pair C1-C2 could be attributed the status of main pair, i.e. the default pair of cameras used by the imaging device of the invention, while the second pair of cameras C3-C4 could be used as an auxiliary pair only if competitors are masked in images obtained from the first pair of cameras C1-C2. FIG. 1B illustrating the same eight lanes L1-L8 and finish line 0, shows the alignment of the four cameras C1,C2,C3,C4 on finish line 0 and their grouping in pairs C1-C2 and C3-C4 on either side of finish line 0. The cameras of each pair are shown with a slight axial offset so that they can be distinguished more easily from each other.

The height offset between the cameras of each pair is chosen, for practical reasons, to be considerably greater than the interocular space to facilitate the positioning of the cameras. In practice, a first space h and a second space h' preferably comprised between 40 and 50 centimeters could be selected, to leave sufficient space to mount the second camera of the pair after the first has been placed in position, and, at the same time, to enable the multiplicative factor of the distance between the cameras of each pair in relation to the mean interocular space to be corrected by zoom effect, i.e. by modifying the focal distance of the camera lens. The first space h and the second space h' do not, however, necessarily need to be equal, and could be adjusted according to the constraints of the place where the competition takes place, to avoid requiring any adjustment to the existing infrastructure and thus to minimise the space constraints of the proposed imaging system.

Figure 2:
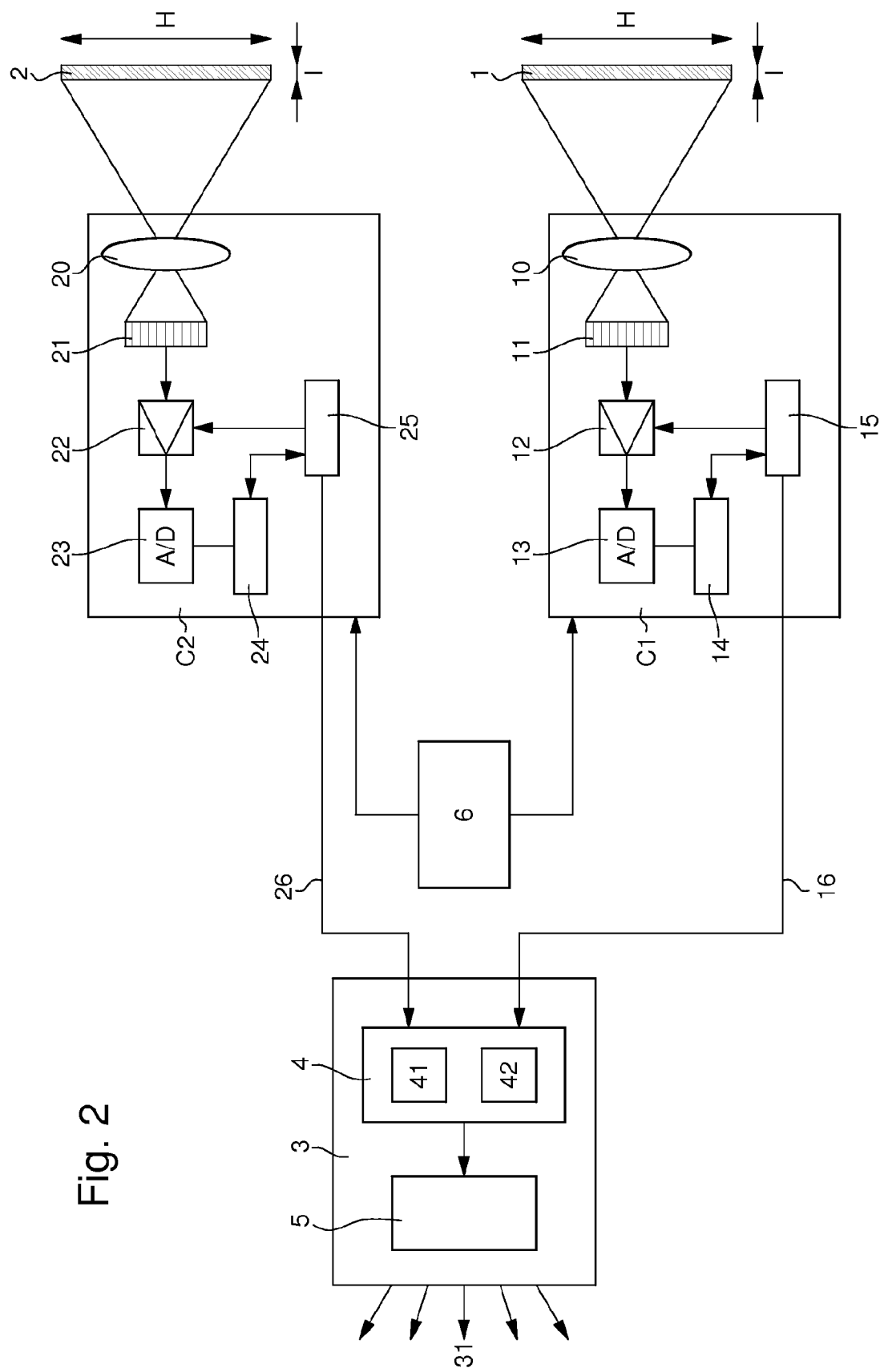
FIG. 2 shows a diagram of the cameras used and an image management system for the production of stereoscopic images according to a preferred embodiment of the invention.

FIG. 2 shows a diagram of the imaging device for a photo finish system according to a preferred embodiment of the invention, showing in detail the physical architecture of the two cameras C1 and C2, illustrated in FIG. 1B above, and the interaction thereof with the timing system 6 and the stereoscopic display system 3.

Each of the first cameras C1 and second camera C2 includes respectively a first and second lens (respectively referenced 10 and 20 for each camera) at the end of a lens assembly for forming respectively a first and second narrow strip image (respectively referenced 1 and 2 for each camera, and also commonly called "frames") of height H and width l via first and second line-scan-charge coupled devices (LS-CCD), or CMOS respectively referenced 11 and 21 for each first and second camera C1 and C2, whose size may be up to several thousand pixels. The lens assembly is preferably adjusted on the finish line to display an image of a predefined height H, which is achieved using a number N of pixels of the matrix seen in FIG. 3. The LS-CCD/CMOS sensor may preferably consist of a matrix with a single column of pixels, so that the corresponding unitary width l of frames 1 and 2 is determined entirely by height H of the image and the number N of pixels of the column of said sensor. According to a variant, a CCD/CMOS matrix sensor having several columns may be used, only one predefined column of which is used to form the images at the finish line.

A respectively first and second image sampler/controller (respectively referenced 15-25 on each first and second camera C1, C2) senses the lighting level at each of the first and second LS-CMOS sensors 11-21 at regular time intervals, then amplifies the output signals using respectively first and second gain controlled amplifiers (respectively referenced 12 and 22) on each of first and second cameras C1-C2) and digitally converts them using respectively first and second analogue-digital converters (A/D, respectively referenced 13-23 for each of first and second cameras C1 and C2) and saves them respectively in a first and second buffer (respectively referenced 14-24 for each of first and second cameras C1 and C2). Thus a series of frames 1 and 2 respectively taken by each of first and second cameras C1 and C2 are saved in the form of first and second pixel columns 101 and 102 respectively (seen in FIG.3), at a sampling frequency preferably higher than or equal to 1000, so that images corresponding to references times separated by a maximum of a thousandth of a second can be formed by aggregating the different first and second pixel columns 101, 102. The sampling frequency thus defines timing accuracy. The buffers preferably contain several hundred megabytes of RAM, for example SDRAM (synchronous dynamic random access memory) for containing several hours of images.

To guarantee synchronisation between each of first and second cameras C1 and C2 on a relative reference time, i.e. in relation to the start of a race, and not only an absolute time, each camera will be connected to timing system 6. Each of the transmitted pixel columns corresponding to a reference time can be saved with a flag corresponding to the reference time and thereby allow for easier subsequent data processing.

The first camera C1 and second camera C2 are each connected to an image management system 4, such as for example a computer server, including a processor 41 and a memory unit 42 for processing data recovered at the output of first and second buffers 14-24 of first and second cameras C1 and C2 and to form a stereoscopic image 30. Image management system 4 is also connected to a monitoring screen 5 to allow an operator to view the images before transmitting them, via a transmission line 31, for example a broadcast line, to television receivers (for example via a digital hertz network conforming to DVB standard) or to a group of computers connected to the Internet via an IP-multicast network.

Thus the stereoscopic display system 3 illustrated in FIG. 2, which includes image management system 4 and the connection to transmission line 31, can firstly form a stereoscopic image 30 from frames received from first and second cameras C1 and C2, and also transmit this image for display on remote receivers (not shown in this Figure).

It will be understood that a similar physical architecture to that described in FIG. 2 will preferably be used for third and fourth cameras C3 and C4 disposed on the opposite side of the finish line, which will also be connected to computer image management system 4 and to timing system 6. These connections may be based on a Wi-Fi type wireless technology depending on the distance between the devices to be connected and the required data transmission flow; for reasons of compactness it will be sought to avoid using cables when unnecessary.

FIG. 3 shows a preferred variant of the method for generating a stereoscopic photo finish image 3. The method for forming a photo finish image in three dimensions contains a preliminary step (A) of defining a shot duration (T), which determines the size of the image required to be displayed, or more specifically the overall width L thereof. Indeed, if each image strip or frame has a unitary width l, the sampling frequency, for example every thousandth of a second, and the shot duration T, which is chosen to be a multiple of a thousandth, such as for example one second, determines a number of pixels M which defines the overall width L of the corresponding image. In these Figures, the time axis t extends from right to left from a selected reference moment To which is the moment at which the frames the furthest to the right are taken, all the other frames having been taken subsequent to this reference moment. It will be understood however that if cameras C3 and C4 were used, with the direction of the race thus reversed, the time axis t would extend from left to right, i.e. still in the opposite direction to the direction of the race.

As seen in FIG. 3, the first and second images taken by first and second cameras C1 and C2 are respectively referenced I1 and I2; they are digitised in the form of a pixel matrix N*M, corresponding to a height H and a width L. The pixel matrix is obtained by aggregating the various pixel columns 101 and 102 respectively corresponding to frames 1 and 2.

In order for each first and second image I1 and I2 of each camera C1 and C2 to correspond to the same moment To, a time synchronisation step (B0) must be carried out on first camera C1 and second camera C2; both cameras are aligned on finish line 0 before being able to form stereoscopic image 30, since, according to this preferred embodiment each of the images forming the stereoscopic image must correspond to what each eye sees simultaneously. Once this synchronisation has been performed as a result of the connection of each camera to timing system 6, there is formed a first image I1, obtained from said first camera C1 for said reference time T0 and a second image I2, obtained from second camera C2 for reference time T0 in steps B1 and B2, produced alternately or simultaneously by image management system 4.

Before aggregating the first and second images (I1, I2) to form a stereoscopic image 30, an additional image rectifying step C may be carried out to make the displayed images easier to read. Indeed, the axis of the two first and second cameras C1, C2—and also that of third and fourth cameras C3, C4 on the opposite side of the finish line—is vertical in the plane of the finish line, and it determines the line of orientation of the eyes perceiving the stereoscopic image. In other words, the stereoscopic image is formed as if first camera C1 were the left or right eye, and second camera C2 the other eye, which would force a television viewer to turn his head 90 degrees to the right or left to see stereoscopic image 30 properly, formed by first and second images I1 and I2, without any other preliminary image processing. Thus, according to a preferred variant of the invention, an additional image rectifying step C will be carried out, consisting, for example, of reverse stacking C' and matrix transposition C'' sub-steps when the rectifying operation is carried out by computer image processing system 4. The sorting sub-step C' allows central axial symmetry to be achieved by saving all the pixel columns corresponding to the frames of images I1 and I2 in LIFO mode (last in first out) in a new data stack, whereas the matrix transposition operation consists in reversing the lines and columns of the matrix. It can be easily appreciated that the step sequence of C' followed by C'' allows each of the images to be rotated 90 degrees in the anti-clockwise direction, while the step sequence of C'' followed by C' allows a 90 degree rotation in the clockwise direction. The choice of one sequence or the other thus virtually assigns one camera to one eye and determines the axis of view: step C' followed by step C'' will associate first camera C1 with the right eye and will rectify images I1 and I2 to produce a stereoscopic image 30 with a front view of the competitors and the reverse sequence, i.e., step C'' followed by step C' will associate first camera C' with the left eye with a back view of the competitors. This is why the images obtained after rectifying step C are reference I1/I2 and I2/I1 in FIG. 3, depending on the selected sequence.

Once this rectifying step has been performed, stereoscopic image 30 can be formed by computer image management system 4 by aggregating two rectified images in aggregation step D, then, in a subsequent step E, stereoscopic display system 3 can emit stereoscopic image 30 on a transmission network 31, for example a broadcast network, for remote display on remote receivers (e.g. TV) after verification by an operator on a monitoring screen. It will be clear that, to determine reference time To, the photo finish system operator could perform preliminary display iteration on monitoring screen 5; this preliminary step could also establish any masking on first camera C1 and the need to switch to the pair of third and fourth cameras C3, C4 on the opposite side of the finish line.

According to the preferred embodiment illustrated, digital processing means are therefore used to rectify the image before forming a stereoscopic image via computer image management system 4; according to an alternative embodiment it is possible to envisage using periscope type optical means with a 45 degree return, which would remove the need for the data processing step. To avoid any modification of the existing structure of cameras used at the finish line, periscope glasses, mounted in a modular manner on the lens, could be used.

Although the solutions for forming stereoscopic images have been described with reference to athletics competitions, it will be understood that the device and method described above may be employed for other types of sport, such as, for example cycling, speed skating or rowing, without departing from the scope of the invention.

The above device and method also have the advantage of only requiring very few modifications of the physical architecture of existing photo finish systems, with the mere possible addition of extra cameras for capturing images from other angles. Thus, the entire intelligence of the system and method proposed is transferred in the back-end of the infrastructure, i.e. in a part invisible to spectators, with additional modules for post-processing the conventional photo finish images obtained by the camera or cameras at the finish line, and specific stereoscopic display means for forming three dimensional images.

The invention claimed is:
1. A photo-finish stereoscopic imaging system, comprising:
 a first pair of cameras, comprising a first camera and a second camera vertically offset from each other by a first height;
 a second pair of cameras, comprising a third camera and a fourth camera vertically offset from each other by a second height, disposed opposite to and directly facing the first pair of cameras; and
 image management circuitry connected to said each camera of the first pair of cameras and to said each camera of the second pair of cameras, and being configured to:
  rectify a first image from the first camera by rotating the first image by 90 degrees in a first direction, the rotating preserving central axial symmetry of the first image and reversing lines and columns of a matrix of pixels that form the first image,
  rectify a second image from the second camera by rotating the second image by 90 degrees in the first direction, the rotating preserving central axial sym- metry of the second image and reversing lines and columns of a matrix of pixels that form the second image, rectify a third image from the third camera by rotating the third image by 90 degrees in a second direction, the rotating preserving central axial symmetry of the third image and reversing lines and columns of a matrix of pixels that form the third image, rectify a fourth image from the fourth camera by rotating the fourth image by 90 degrees in the second direction, the rotating preserving central axial symmetry of the fourth image and reversing lines and columns of a matrix of pixels that form the fourth image, aggregate the rectified first image and the rectified second image to form a first stereoscopic image, and aggregate the rectified third image and the rectified fourth image to form a second stereoscopic image.

2. The imaging system according to claim 1, wherein each of the first height and the second height is greater than an interocular space.

3. The imaging system according to claim 1, further comprising timing circuitry configured to synchronize each of the first image, the second image, the third image, and the fourth image to correspond to a same time.

4. The imaging system according to claim 1, wherein each of the first camera, the second camera, the third camera, and the fourth camera includes a line scan sensor.

5. The imaging system according to claim 1, wherein the image management circuitry is connected to a monitoring screen and to a transmission network, and is further configured to output the first stereoscopic image and the second stereoscopic image to the monitoring screen and to the transmission network.

6. A method for forming at least one photo-finish stereoscopic image, comprising:

aligning a first pair of cameras with a second pair of cameras disposed opposite to and directly facing the first pair of cameras, wherein the first pair of cameras comprises a first camera and a second camera vertically offset from each other by a first height, and wherein the second pair of cameras comprises a third camera and a fourth camera vertically offset from each other by a second height;

defining a shot duration for each image taken by each of the first camera, the second camera, the third camera, and the fourth camera;

time synchronizing a first image from the first camera, a second image from the second camera, a third image from the third camera, and a fourth image from the fourth camera to correspond to a same reference time for the shot duration;

rectifying the first image, using image management circuitry, by rotating the first image by 90 degrees in a first direction, the rotating preserving central axial symmetry of the first image and reversing lines and columns of a matrix of pixels that form the first image;

rectifying the second image, using the image management circuitry, by rotating the second image by 90 degrees in the first direction, the rotating preserving central axial symmetry of the second image and reversing lines and columns of a matrix of pixels that form the second image;

rectifying the third image, using the image management circuitry, by rotating the third image by 90 degrees in a second direction, the rotating preserving central axial symmetry of the third image and reversing lines and columns of a matrix of pixels that form the third image;

rectifying the fourth image, using the image management circuitry, by rotating the fourth image by 90 degrees in the second direction, the rotating preserving central axial symmetry of the fourth image and reversing lines and columns of a matrix of pixels that form the fourth image;

aggregating the rectified first image and the rectified second image to form a first stereoscopic image; and aggregating the rectified third image and the rectified fourth image to form a second stereoscopic image.

7. The method according to claim 6, wherein the central axial symmetry of each of the first through fourth images is preserved by a reverse stacking of the images into a data stack by saving all the respective columns of the matrix of pixels that forms each of the images in a last-in first-out mode, and wherein the reversing of all the respective lines and columns of the matrix of pixels that forms said each of the images is performed after the reverse stacking.

8. The method according to claim 6, further comprising transmitting the first stereoscopic image and the second stereoscopic image to a monitoring screen or over a transmission network for remote display.

* * * * *